(12) United States Patent
Yan et al.

(10) Patent No.: US 8,536,735 B2
(45) Date of Patent: Sep. 17, 2013

(54) CONVERTER WITH INPUT VOLTAGE BALANCE CIRCUIT

(75) Inventors: Chao Yan, Shanghai (CN); Yiqing Ye, Shanghai (CN); Chongfeng Zheng, Shanghai (CN); Jianping Ying, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 72 days.

(21) Appl. No.: 13/364,058

(22) Filed: Feb. 1, 2012

(65) Prior Publication Data

US 2012/0262955 A1      Oct. 18, 2012

Related U.S. Application Data

(63) Continuation-in-part of application No. 13/090,925, filed on Apr. 20, 2011, now Pat. No. 8,279,633, which is a continuation of application No. 12/394,571, filed on Feb. 27, 2009, now abandoned.

(30) Foreign Application Priority Data

Dec. 9, 2011   (CN) .......................... 2011 1 0409382

(51) Int. Cl.
*H02J 1/00*   (2006.01)
*H02J 3/00*   (2006.01)
*H02J 1/10*   (2006.01)
*H02M 3/335*  (2006.01)

(52) U.S. Cl.
USPC ................... 307/77; 307/82; 363/17; 363/65

(58) Field of Classification Search
USPC .......... 363/21.02, 21.03, 65, 71, 17; 307/82, 307/77
See application file for complete search history.

(56) References Cited

U.S. PATENT DOCUMENTS

| | | | |
|---|---|---|---|
| 5,786,992 A * | 7/1998 | Vinciarelli et al. | 363/89 |
| 7,872,886 B2 * | 1/2011 | Xu et al. | 363/65 |
| 2004/0233685 A1 * | 11/2004 | Matsuo et al. | 363/65 |
| 2005/0286277 A1 * | 12/2005 | Krein | 363/65 |
| 2007/0159862 A1 * | 7/2007 | Vinciarelli | 363/65 |

* cited by examiner

*Primary Examiner* — Jessica Han
*Assistant Examiner* — Ivan Laboy Andino
(74) *Attorney, Agent, or Firm* — Morris Manning & Martin LLP; Tim Tingkang Xia, Esq.

(57) ABSTRACT

In one aspect of the present invention, a converter circuit with input voltage balance includes a plurality of modules having inputs electrically series-connected to each other and outputs electrically parallel-connected to each other and a plurality of switching circuits with each electrically connected to an input connection node of a corresponding module and its immediate next module, and configured such that when an input voltage of the corresponding module or its immediate next module is in a desired range from a first predetermine value to a second predetermined value greater than the first predetermined value, the switching circuit operates in an open state, while when the input voltage is out of the desired range, the switching circuit operates in a conductive state so as to regulate the input voltage of the corresponding module or its immediate next module in the desired range.

25 Claims, 11 Drawing Sheets

CONVERTER WITH INPUT VOLTAGE BALANCE CIRCUIT

CROSS-REFERENCE TO RELATED PATENT APPLICATION

This application is a continuation-in-part application of a co-pending U.S. patent application Ser. No. 13/090,925, filed on Apr. 20, 2011, entitled "PARALLEL-CONNECTED RESONANT CONVERTER CIRCUIT AND CONTROLLING METHOD THEREOF", by Haoyi Ye et al., which itself is a continuation application of U.S. patent application Ser. No. 12/394,571, Feb. 27, 2009, entitled "PARALLEL-CONNECTED RESONANT CONVERTER CIRCUIT AND CONTROLLING METHOD THEREOF", by Haoyi Ye et al., which status is abandoned and which itself claims priority to and the benefit of, pursuant to 35 U.S.C. §119(a), Taiwan patent application No. 097109222, filed on Mar. 14, 2008, entitled "PARALLEL-CONNECTED RESONANT CONVERTER CIRCUIT AND CONTROLLING METHOD THEREOF", by Haoyi Ye et al., all of the contents of which are incorporated herein by reference in their entireties.

This application also claims priority to and the benefit of, pursuant to 35 U.S.C. §119(a), Chinese patent application No. 201110409382.X, filed Dec. 9, 2011, entitled "CONVERTER WITH INPUT VOLTAGE BALANCE CIRCUIT", by Chao Yan et al., the content of which is incorporated herein by reference in its entirety.

Some references, if any, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present invention generally relates to a converter, and more particularly, to a converter that utilizes one or more switching circuits to balance/regulate input voltages of interleaving modules or resonant converters thereof.

BACKGROUND OF THE INVENTION

A DC/DC converter is an electronic device that converts a source of direct current (DC) from one voltage level to another. The converters are important in portable electronic devices such as cellular phones and laptop computers, which are supplied with power from batteries primarily.

Resonant converters comprised of interleaving multiple LLC circuits are widely used because they can improve power conversion efficiency and reduce the ripple on the output current of the converter. One exemplary interleaving LLC resonant converter disclosed in U.S. patent application Ser. Nos. 13/090,925 and 12/394,571 to which the present application claims priority includes two LLC resonant converters of a same architecture with their inputs electrically series-connected and their outputs electrically parallel-connected so as to make them share a same input voltage source, and supply a same output load. For such a converter, a current balance among the LLC resonant converters can be achieved by automatically adjusting input voltages of the LLC resonant converters while keeping the switching frequencies of the LLC resonant converters the same. However, under certain operation conditions, there may be imbalance between the input voltages of the two LLC resonant converters, i.e., one input voltage is very high while the other is very low, which makes voltage ratings of components for one LLC resonant converter too high, thereby affecting the normal operation of the LLC resonant converter.

Therefore, a heretofore unaddressed need exists in the art to address the aforementioned deficiencies and inadequacies.

SUMMARY OF THE INVENTION

The present invention, in one aspect, relates to a converter circuit. In one embodiment, the converter circuit includes a plurality of modules, a plurality of voltage sources and a plurality of switching circuits.

Each module has a first input, a second input, a first output and a second output. The second input of any one but the last module is electrically connected to the first input of its immediate next module, and all the first outputs and the second outputs of the plurality of modules are electrically parallel-connected. In one embodiment, each module comprises a resonant converter, where the resonant converter comprises an LLC series resonant DC/DC converter or an LLC parallel resonant DC/DC converter. In one embodiment, the plurality of modules operates at substantially the same frequency.

Each voltage source has a first terminal and a second terminal. The plurality of voltage sources is electrically series-connected to each other, i.e., the second terminal of any one but the last voltage source is electrically connected to the first terminal of its immediate next voltage source. The first terminal of the first voltage source is electrically connected to the first input of the first module. The second terminal of the last voltage source is electrically connected to the second input of the last module. In one embodiment, each voltage source comprises a polarized capacitor.

Each switching circuit has a first terminal, a second terminal, an open state in which no electric current is allowed to pass through from one of the first and second terminals to the other of the first and second terminals, and a conductive state in which electric current is allowed to pass through from one of the first and second terminals to the other of the first and second terminals. The first terminal of each switching circuit is electrically connected to a connection node of the second input of a corresponding module and the first input of its immediate next module, and the second terminal of each switching circuit is electrically connected to a connection node of the second input of a corresponding voltage source and the first input of its immediate next voltage source. In operation, when an input voltage of the corresponding module or its immediate next module is in a desired range from a first predetermine value to a second predetermined value greater than the first predetermined value, the switching circuit operates in the open state, while when the input voltage of the corresponding module or its immediate next module is out of the desired range, the switching circuit operates in the conductive state so as to, through the corresponding voltage source or its immediate next voltage source, regulate the input voltage of the corresponding module or its immediate next module to the desired range. In one embodiment, each switching circuit comprises a switch. In another embodiment, each switching circuit further comprises a resistor electrically connected to the switch. In one embodiment, the switch comprises a bidirectional transient voltage suppressor (TVS), a varistor, a gas tube, a relay, one or more transistors, or a combination thereof.

In one embodiment, the converter circuit further includes a plurality of input capacitors, each capacitor having a first terminal and a second terminal, where the first and second terminals of each capacitor are electrically connected to the first and second inputs of a corresponding module, respectively, and an output capacitor having a first terminal and a second terminal electrically connected to the first output and the second output of each module, respectively.

The converter circuit may also have a controller adapted for sensing the input voltage of each module for operating a corresponding switching circuit.

In one embodiment, the converter circuit further comprises a power factor correction (PFC) circuit electrically coupled between the plurality of voltage sources and an external power source.

Additionally, the converter circuit may have an electromagnetic interference (EMI) filter electrically coupled between the PFC circuit and the external power source.

In another aspect of the present invention, A converter circuit includes a plurality of modules, each modules having a first input, a second input, a first output and a second output, where the second input of any one but the last module is electrically connected to the first input of its immediate next module, and all the first outputs and the second outputs of the plurality of modules are electrically parallel-connected, and a plurality of switching circuits, each switching circuit having a first terminal, a second terminal, an open state in which no electric current is allowed to pass through from one of the first and second terminals to the other of the first and second terminals, and a conductive state in which electric current is allowed to pass through from one of the first and second terminals to the other of the first and second terminals, where the first terminal of each switching circuit is electrically connected to a connection node of the second input of a corresponding module and the first input of its immediate next module, such that when an input voltage of the corresponding module or its immediate next module is in a desired range from a first predetermine value to a second predetermined value greater than the first predetermined value, the switching circuit operates in the open state, and when the input voltage of the corresponding module or its immediate next module is out of the desired range, the switching circuit operates in the conductive state so as to regulate the input voltage of the corresponding module or its immediate next module to the desired range.

Further, the converter circuit may have a plurality of voltage sources, each voltage source having a first terminal and a second terminal, where the second terminal of any one but the last voltage source is electrically connected to the first terminal of its immediate next voltage source, the first terminal of the first voltage source is electrically connected to the first input of the first module, and the second terminal of the last voltage source is electrically connected to the second input of the last module, and the second terminal of each switching circuit is electrically connected to a connection node of the second input of a corresponding voltage source and the first input of its immediate next voltage source.

Moreover, the converter circuit also has a controller adapted for sensing the input voltage of each module for operating a corresponding switching circuit.

In one embodiment, each module comprises a resonant converter, where the resonant converter comprises an LLC series resonant DC/DC converter or an LLC parallel resonant DC/DC converter.

In one embodiment, each switching circuit comprises a switch. In another embodiment, each switching circuit further comprises a resistor electrically connected to the switch. In one embodiment, the switch comprises a bidirectional TVS, a varistor, a gas tube, a relay, one or more transistors, or a combination thereof.

In yet another aspect, the present invention relates to a method for regulating input voltages of a converter circuit that has a plurality of modules, each modules having a first input, a second input, a first output and a second output, where all the first inputs and the second inputs of the plurality of modules are electrically series-connected and all the first outputs and the second outputs of the plurality of modules are electrically parallel-connected. In one embodiment, each module comprises a resonant converter, where the resonant converter comprises an LLC series resonant DC/DC converter or an LLC parallel resonant DC/DC converter.

In one embodiment, the method includes the steps of providing a plurality of switching circuits, each switching circuit having a first terminal, a second terminal, an open state in which no electric current is allowed to pass through from one of the first and second terminals to the other of the first and second terminals, and a conductive state in which electric current is allowed to pass through from one of the first and second terminals to the other of the first and second terminals, where the first terminal of each switching circuit is electrically connected to a connection node of the second input of a corresponding module and the first input of its immediate next module; and operating each switching circuit in one of the open state and the conductive state in accordance with an input voltage of each module, such that when the input voltage of a module is in a desired range from a first predetermine value to a second predetermined value greater than the first predetermined value, a corresponding switching circuit operates in the open state, while when the input voltage of the module is out of the desired range, the corresponding switching circuit operates in the conductive state so as to regulate the input voltage of the module to the desired range.

The method may further include the step of sensing the input voltage of each module.

Additionally, the method may also have the step of providing a plurality of voltage sources, each voltage source having a first terminal and a second terminal, where the second terminal of any one but the last voltage source is electrically connected to the first terminal of its immediate next voltage source, the first terminal of the first voltage source is electrically connected to the first input of the first module, and the second terminal of the last voltage source is electrically connected to the second input of the last module, and the second terminal of each switching circuit is electrically connected to a connection node of the second input of a corresponding voltage source and the first input of its immediate next voltage source.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
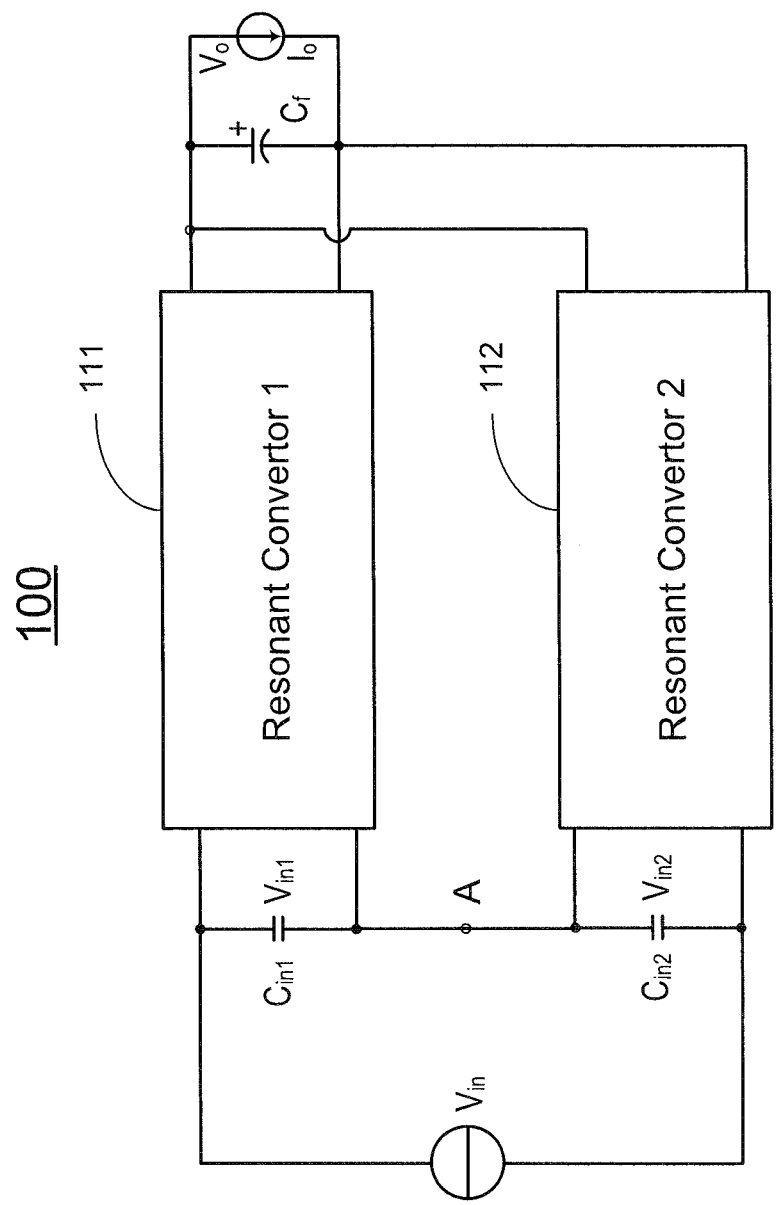
FIG. 1 shows a schematic diagram of a converter circuit according to one embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present invention in conjunction with the accompanying drawings in FIGS. 1-11. In accordance with the purposes of this invention, as embodied and broadly described herein, this invention, in one aspect, relates to a converter that utilizes switching circuit for balancing input voltage. The converter in one embodiment is a resonant convertor.

FIG. 1 shows a schematic diagram of a resonant converter 100 disclosed in U.S. patent application Ser. Nos. 13/090,925 and 12/394,571 to which the present application claims priority. The converter 100 has two parallel-connected resonant circuits 111 and 112 operating in an interleaved mode. Usually, in a resonant converter, different output currents are achieved through changing its resonant frequency. However, for such a converter 100, since the two parallel-connected resonant circuits 111 and 112 operate in interleaved mode, they operate at substantially the same switching frequency, and the output currents are balanced by automatically adjusting the input voltages of the two parallel-connected resonant circuits 111 and 112. As such, the operation of each resonant circuits 111/112 is completely synchronized, thereby reducing the ripples on the current of input capacitors $C_{in1}$ and $C_{in2}$ of the circuits 111 and 112.

Figure 2:
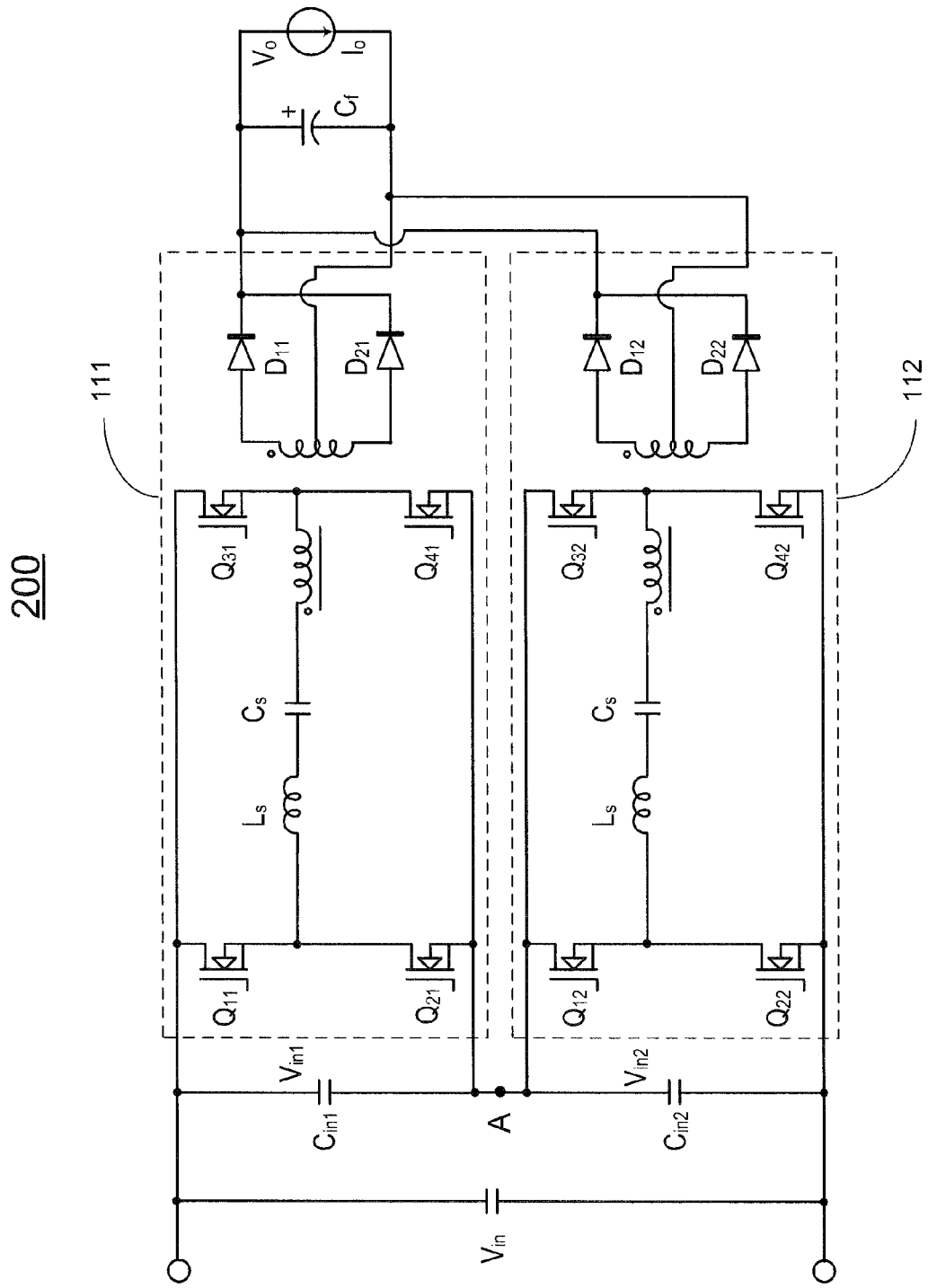
FIG. 2 shows a specific circuit diagram of the converter circuit as shown in FIG. 1.
Figure 3:
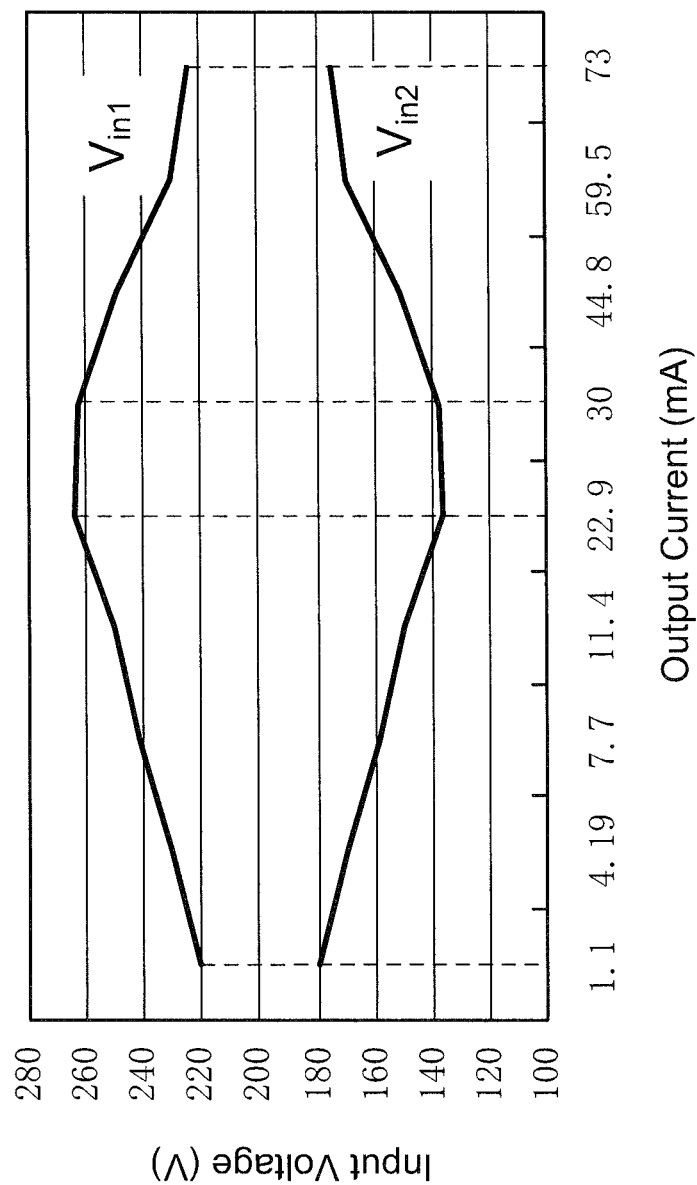
FIG. 3 shows the relationship of input voltages and output voltage of the converter circuit as shown in FIG. 2.

FIG. 2 shows a specific circuit of the resonant converter 100. Each module (resonant converter) 111/112 is adapted to have a series-connected full-bridge ($Q_{11/2}$, $Q_{21/2}$, $Q_{31/2}$ and $Q_{41/2}$) LLC resonant circuit. By automatically adjusting the input voltages $V_{in1}$ and $V_{in2}$ of the input capacitors $C_{in1}$ and $C_{in2}$, the output currents of the LLC resonant circuits 111 and 112 are balanced while operating at substantially the same frequency. Since the input voltage Vin from an external power source is fixed, changes in any one of the input voltages $V_{in1}$ and $V_{in2}$ result in changes of the voltage at a node A. In a normal operation, the node A is floated, and its voltage can be varied with different load conditions. Thus, it is desired that in the normal operation, the input voltage difference between the two LLC resonant circuits 111 and 112 is kept within a desired range, for example, less than about 20V. Accordingly, a same circuit design (architecture) is applicable to each module (resonant converter), which simplifies the overall design of the converter. As shown in FIG. 3, the input voltage difference ($V_{in1}-V_{in2}$) between the two LLC resonant circuits 111 and 112 varies with the output currents of the two LLC resonant circuits 111 and 112. Under certain output currents, the input voltage difference is very large and may reach as much as about 30%. This will cause damages of electronic components, e.g., switches, of the LLC resonant circuits 111 and 112, or require the use of electronic components bearing much higher voltage ratings.

Figure 4:
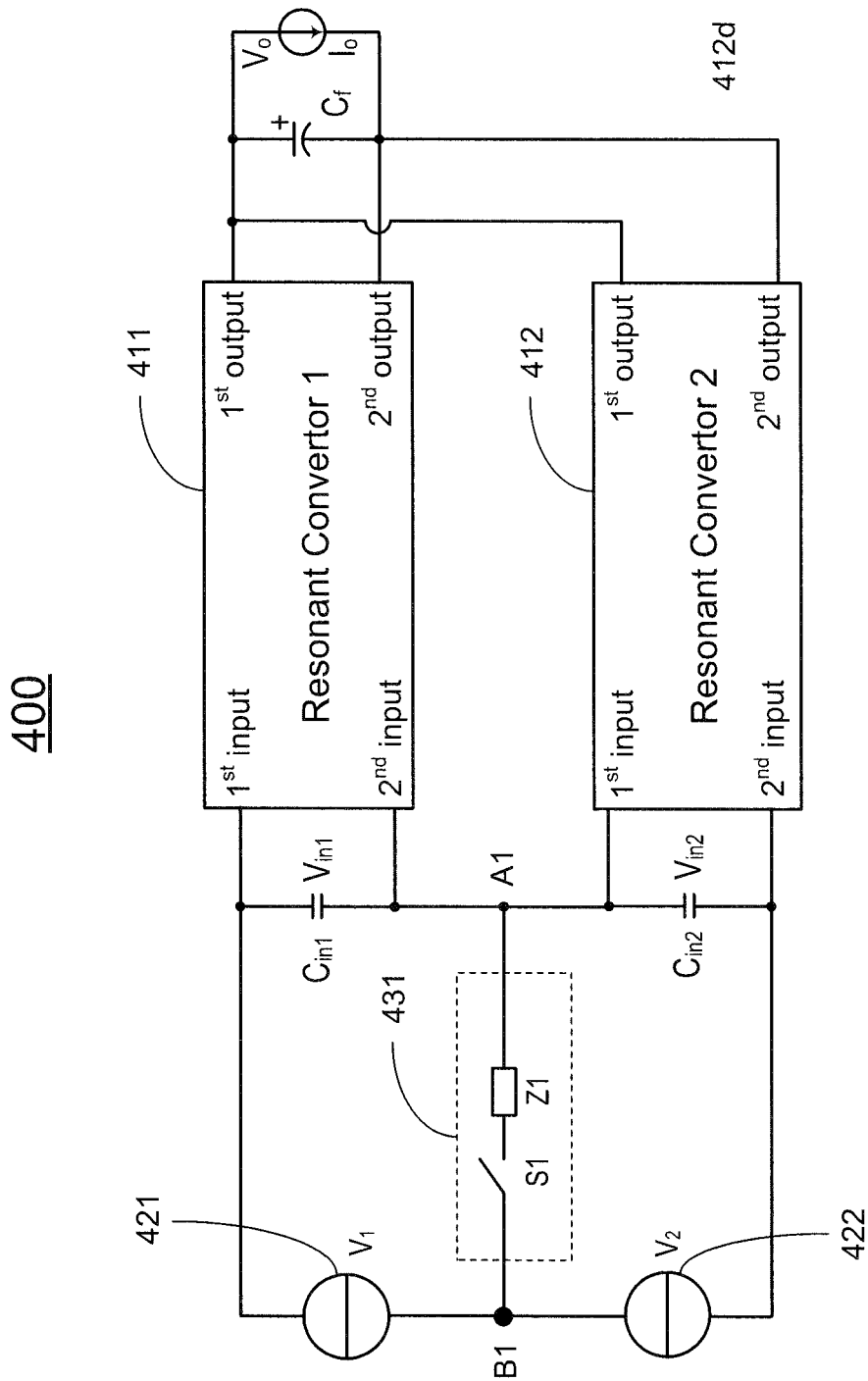
FIG. 4 shows a schematic diagram of a converter circuit according to one embodiment of the present invention.

According to the present invention, one or more switching circuits are adapted in such a converter design for balancing/regulating the input voltages of interleaving modules or resonant converter circuits. Referring now to FIG. 4, the converter circuit 400 is schematically shown according to one embodiment of the present invention. The converter circuit 400 is similar to the converter circuit 100 shown in FIG. 1, including two resonant converter circuits 411 and 412 interleavingly connected to one another. In addition, the converter circuit 400 includes two voltage sources 421 and 422 and one switching circuit 431.

Each resonant converter circuit 411/412 has a first input, a second input, a first output and a second output. The second input of the first resonant converter circuit 411 is electrically connected to the first input of the second resonant converter circuit 412, and the first outputs of the two resonant converter circuits 411 and 412 are electrically connected together, and the second outputs of the two resonant converter circuits 411 and 412 are electrically connected together. Additionally, each resonant converter circuit 411/412 has an input capacitor $C_{in1}/C_{in2}$ electrically connected between the first and second inputs of the resonant converter circuit 411/412. The voltage $V_{in1}/V_{in2}$ of the input capacitor $C_{in1}/C_{in2}$ is the input voltage of the corresponding resonant converter circuit 411/412.

Each voltage source 421/422 has a first terminal and a second terminal. The two voltage sources are electrically series-connected to each other, i.e., the second terminal of the first voltage source 421 is electrically connected to the first terminal of the second voltage source 422. The first terminal of the first voltage source 421 is electrically connected to the first input of the first resonant converter circuits 411. The second terminal of the second voltage source 422 is electrically connected to the second input of the second resonant converter circuits 412.

The switching circuit 431 has a first terminal electrically connected to the input connection node A1 of the second input of the first resonant converter circuits 411 and the first input of the second resonant converter circuits 412, and a second terminal electrically connected to the connection node B1 of the second input of the first voltage source 421 and the first input of the second voltage source 422. The switching circuit 431 is configured to have an open state in which no electric current is allowed to pass through from one of the first and second terminals to the other of the first and second terminals, and a conductive state in which electric current is allowed to pass through from one of the first and second terminals to the other of the first and second terminals.

In operation, when the input voltage $V_{in1}/V_{in2}$ of the first or second resonant converter circuit 411/412 is within a desired range from a first predetermine value to a second predetermined value greater than the first predetermined value, the switching circuit 431 operates in the open state. When the input voltage $V_{in1}/V_{in2}$ of the first or second resonant converter circuit 411/412 is out of the desired range, the switching circuit 431 operates in the conductive state, i.e., the first and second resonant converter circuits 411 and 412 are electrically connected to the first and second voltage sources 421 and 422 by the conductive state of the switching circuit 431. Accordingly, the input voltages $V_{in1}$ and $V_{in2}$ of the first and second resonant converter circuits 411 and 412 are regulated in accordance with the voltages $V_1$ and $V_2$ of the first and second voltage sources 421 and 422, respectively. Since the voltages $V_1$ and $V_2$ of the first and second voltage sources 421 and 422 can be controlled externally, the input voltages $V_{in1}$ and $V_{in2}$ of the first and second resonant converter circuits 411 and 412 can be easily adjusted to the desired range. The first and second predetermined values and the desired range of the input voltage are design parameters of the resonant converter circuit 411/412 and can be varied with different designs of the resonant converter circuit 411/412.

Figure 11:
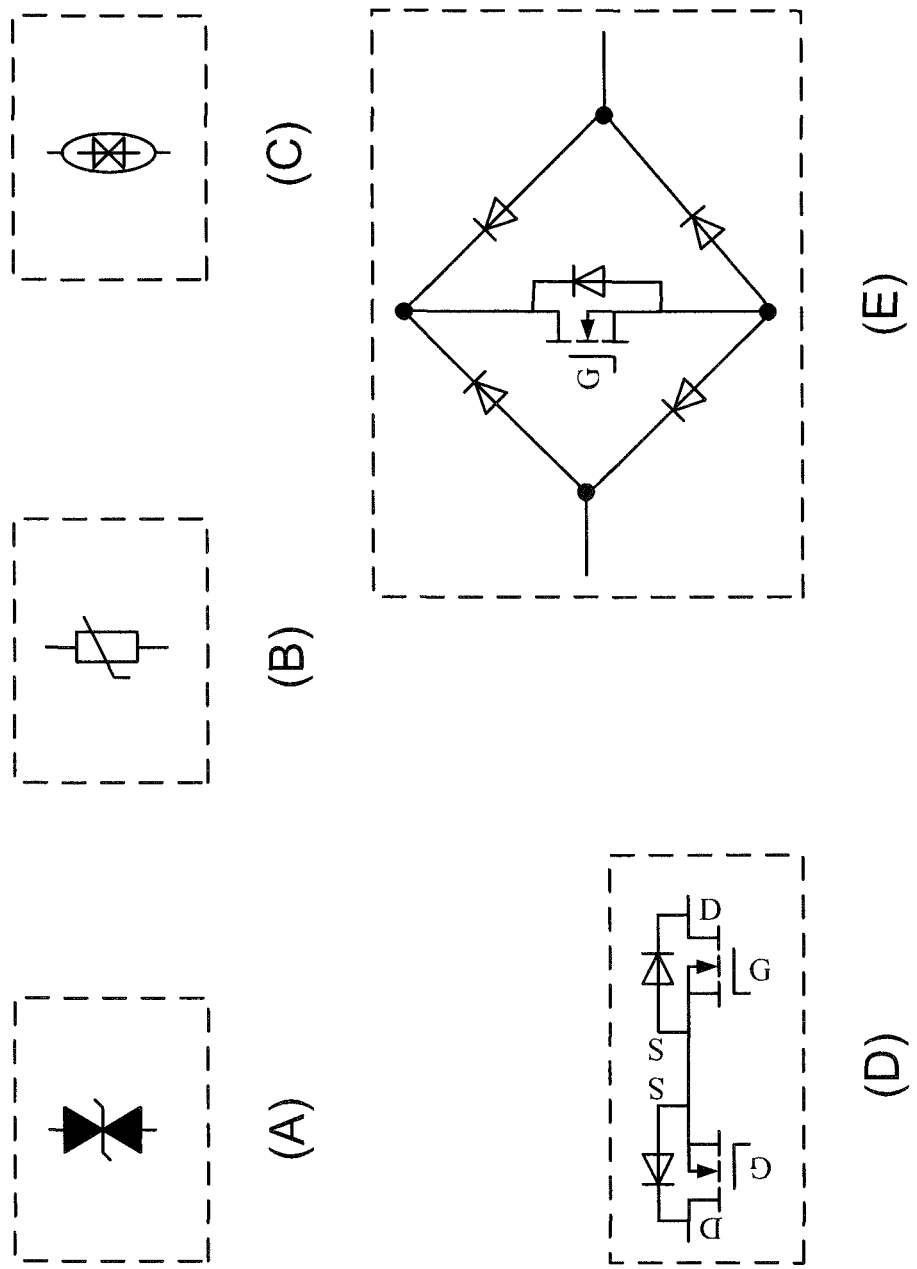
FIG. 11 shows different types (A)-(E) of switches unitized in a converter circuit of the present invention.

As shown in FIG. 4, the switching circuit 431 includes a switch, S1, and a resistor, Z1, electrically connected to the switch S1. The switch S1 can be any type of switches, for example, a bidirectional transient voltage suppressor (TVS), a varistor, a gas tube, a relay, one or more transistors, or a combination thereof, as shown in FIG. 11.

Figure 5:
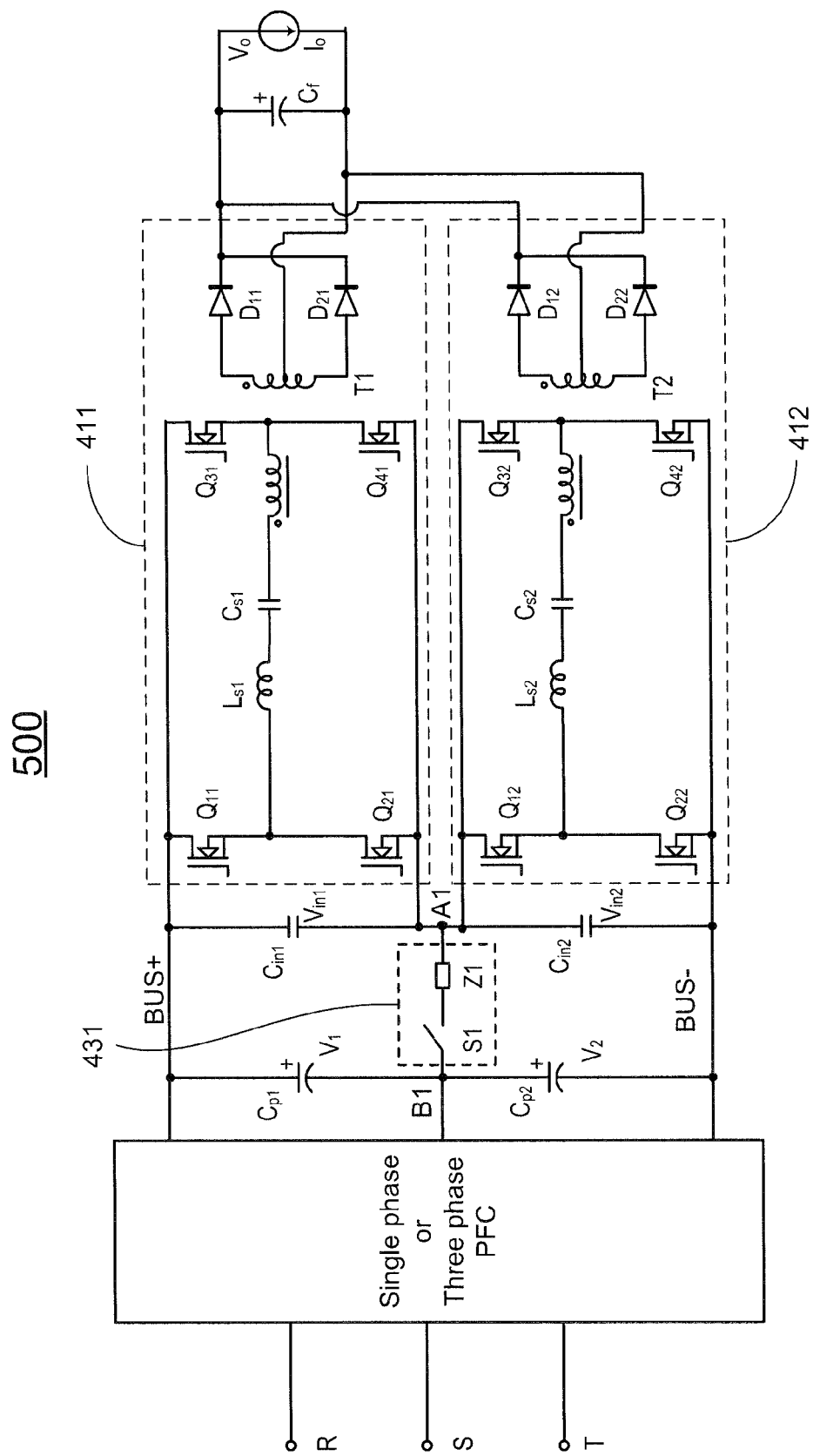
FIG. 5 shows a specific circuit diagram of a converter circuit according to one embodiment of the present invention.
Figure 6:
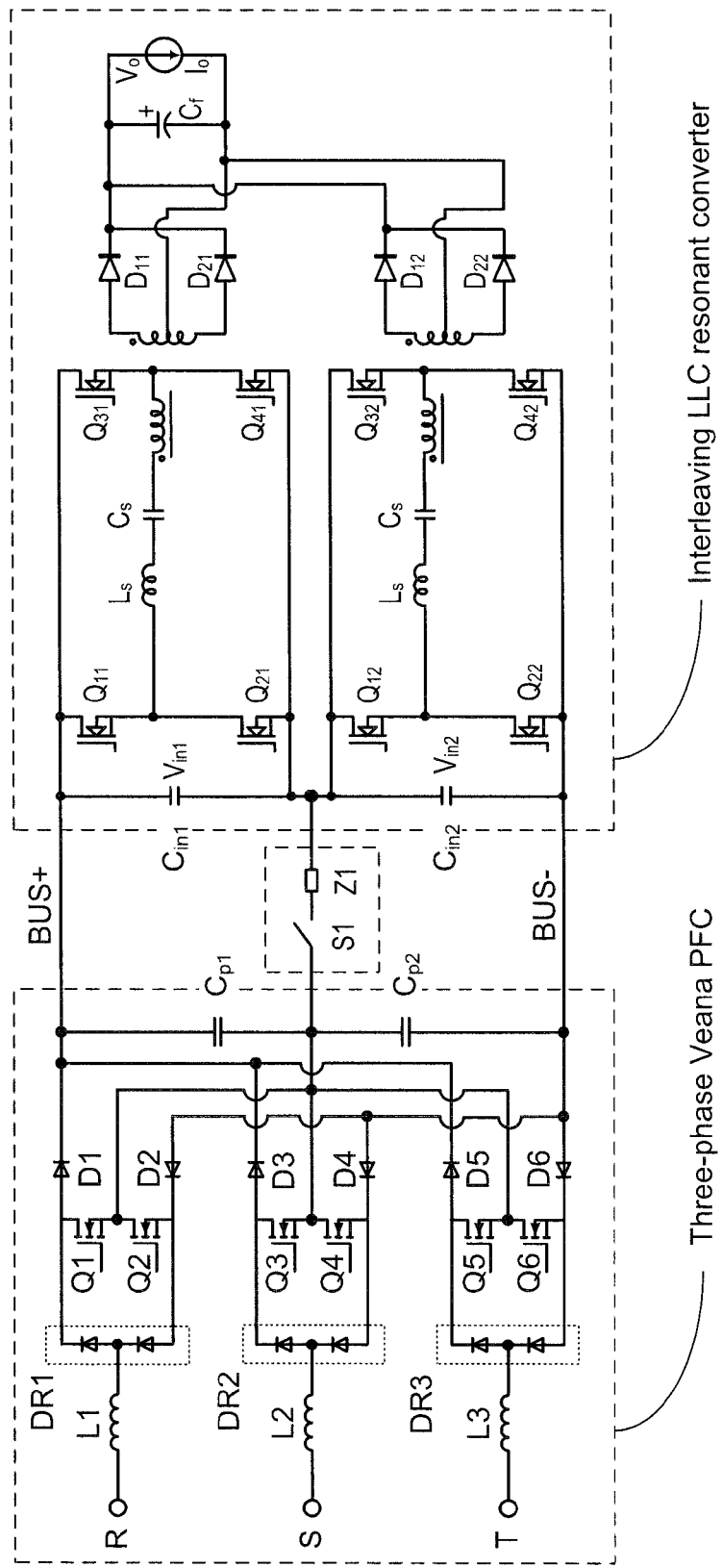
FIG. 6 shows a specific circuit diagram of a converter circuit according to another embodiment of the present invention.
Figure 7:
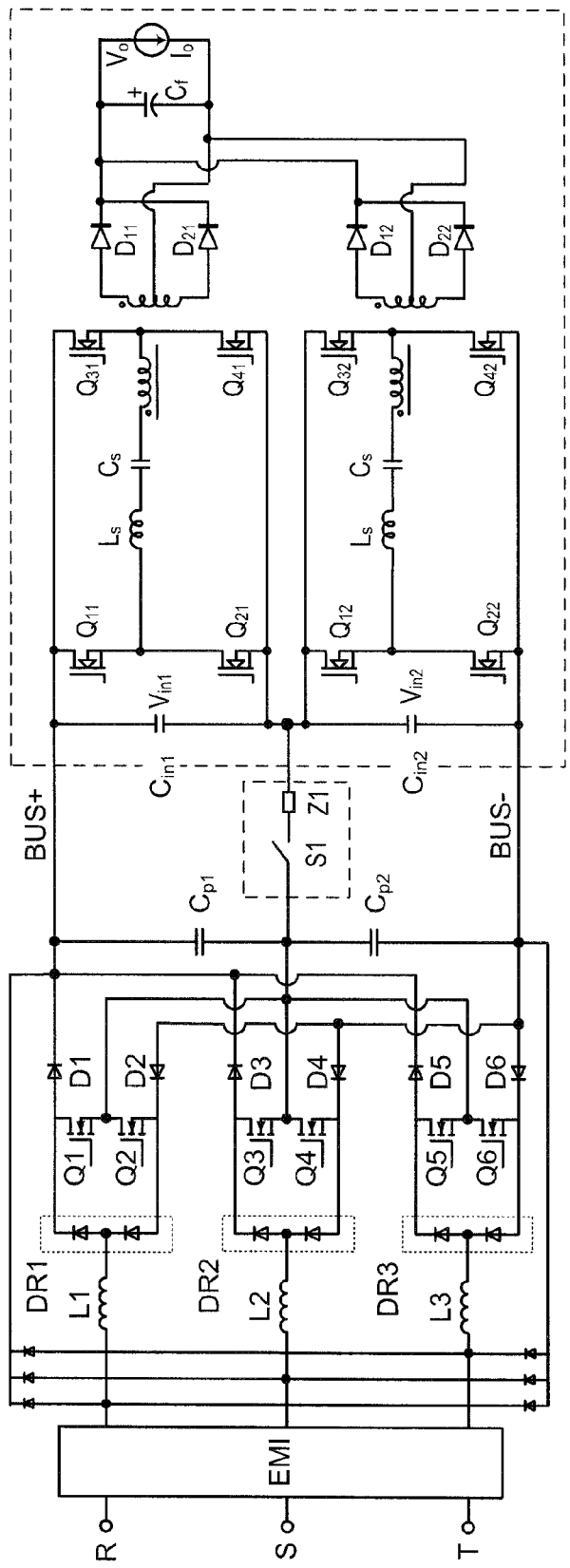
FIG. 7 shows a specific circuit diagram of a converter circuit according to yet another embodiment of the present invention.

FIGS. 5-7 show respectively three specific circuits 500, 600 and 700 of the resonant converter 400 shown in FIG. 4. As shown in FIG. 5, in the resonant converter circuit 500, each resonant converter 411/412 comprises a series-connected LLC resonant converter circuit of the same architecture. In this exemplary embodiment, the LLC resonant converter circuit 411/412 includes a full bridge circuit of four switches $Q_{11}/Q_{12}$, $Q_{21}/Q_{22}$, $Q_{31}/Q_{32}$ and $Q_{41}/Q_{42}$ electrically series-connected to an LLC resonant circuit, and an half bridge circuit of two diodes $D_{11}/D_{21}$ and $D_{12}/D_{22}$ electrically coupled to the full bridge circuit through a transformer T1/T2. It should be appreciated to those of skill in the art that other types of LLC resonant converter circuits such as parallel-connected LLC resonant circuits can also be utilized to practice the present invention. Further, other configurations of the LLC resonant circuits can also be used to practice the present invention.

In the exemplary embodiment shown in FIG. 5, each voltage source includes a polarized capacitor $C_{p1}/C_{p2}$. Further, a single-phase or three-phase power factor correction (PFC) circuit is employed to electrically couple with the voltage sources and an external power source (indicated by R, S, T). The LLC resonant converter circuits 411 and 412 are connected to the voltage sources by BUS+ and BUS−, where the voltage difference between BUS+ and BUS− can be maintained in a stable range by the voltage sources.

As discussed above, even if the voltages of BUS+ and BUS− are stable during operation, the imbalance between the input voltages $V_{in1}$ and $V_{in2}$ of the LLC resonant converter circuits 411 and 412 may exist under certain circumstances. In order to balance the input voltages $V_{in1}$ and $V_{in2}$ of the LLC resonant converter circuits 411 and 412, a switching circuit 431 is coupled between the LLC resonant converter circuits 411 and 412 (at the node A1) and the voltage sources (at the node B1). When the input voltages $V_{in1}$ and $V_{in2}$ of the LLC resonant converter circuit 411/412 is out of a desired range, the switching circuit 431 is activated to be in the conductive state, thereby causing current flows between the LLC resonant converter circuits 411 and 412 and the voltage sources. Since the voltage potential at the node B1 is determined by the PFC circuit, the voltages $V_1$ and $V_2$ can be very stable and suitable for regulating the input voltages $V_{in1}$ and $V_{in2}$, respectively.

FIG. 6 shows the resonant converter circuit 600 that is essentially the same as the circuit 500 shown in FIG. 5, where the PFC circuit is specified as the three-phase Veana PFC.

As shown in FIG. 7, in addition to the configuration of the resonant converter circuit 600, the resonant converter circuit 700 further includes an electromagnetic interference (EMI) filter electrically coupled between the three-phase Veana PFC circuit and the external power source (indicated by R, S, T).

Figure 8:
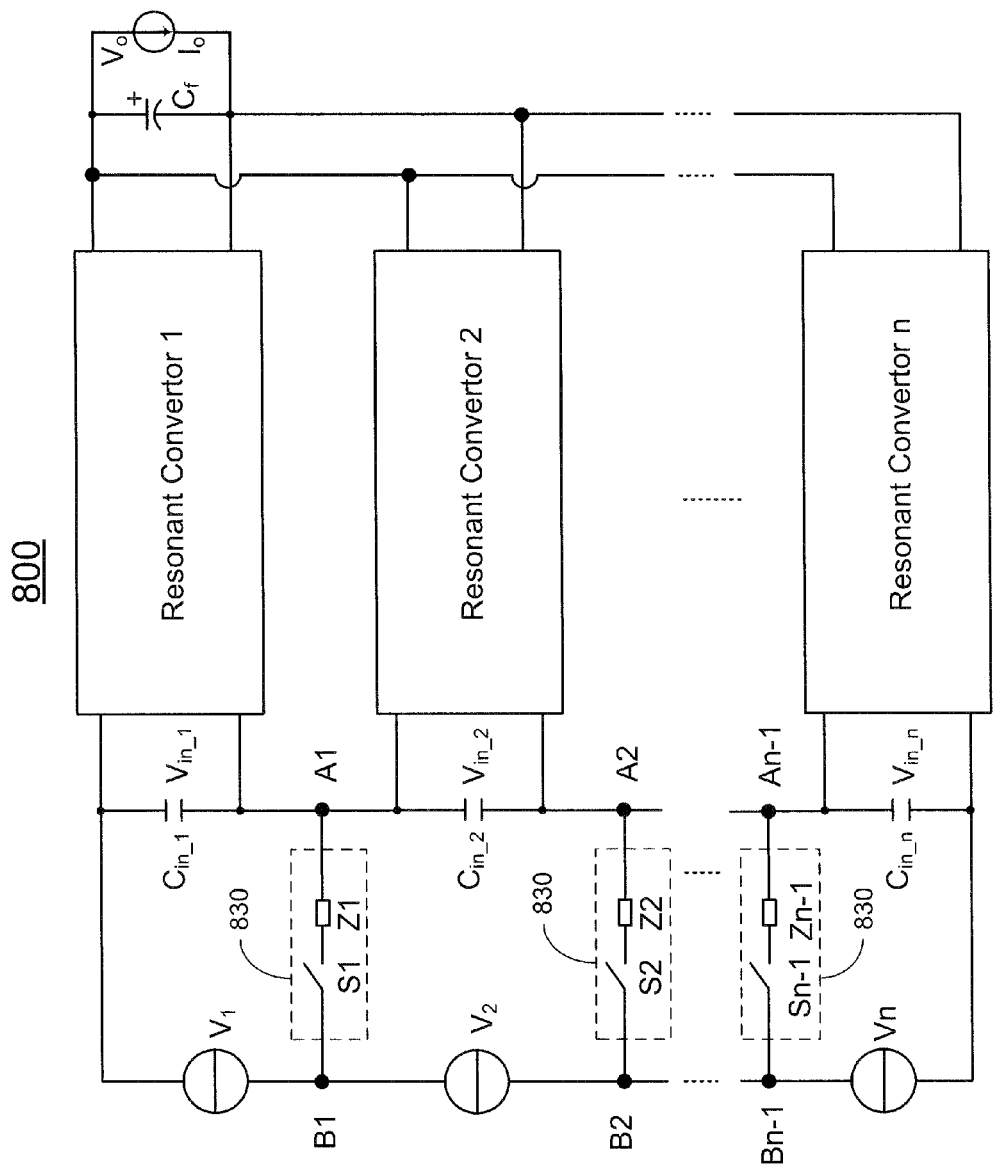
FIG. 8 shows a schematic diagram of a converter circuit according to one embodiment of the present invention.

Referring to FIG. 8, a schematic diagram of a converter circuit 800 is shown according to one embodiment of the present invention. The converter circuit 800 is an extension of the resonant converter 400 shown in FIG. 4. The converter circuit 800 includes n parallel-connected resonant converters operating in the interleaved mode, N voltage sources, $V_1$, $V_2$, ..., $V_n$, n input capacitors $C_1$, $C_2$, ..., $C_n$, (n−1) switching circuits 830, and an output capacitor $C_f$ for providing an output voltage, where n is a natural number larger than two.

Each resonant converter has a first input, a second input, a first output and a second output. The second input of any one but the n-th resonant converter is electrically connected to the first input of its immediate next resonant converter, and all the first outputs and the second outputs of the plurality of modules are electrically parallel-connected. Each resonant converter can be an LLC series resonant DC/DC converter or an LLC parallel resonant DC/DC converter.

Each capacitor $C_1$, $C_2$, ..., or $C_n$ is electrically connected between the first and second inputs of a corresponding module.

Each voltage source $V_1$, $V_2$, ..., or $V_n$ has a first terminal and a second terminal. The n voltage sources are electrically series-connected to each other, i.e., the second terminal of any one but the n-th voltage source is electrically connected to the first terminal of its immediate next voltage source. The first terminal of the first voltage source $V_1$ is electrically connected to the first input of the first resonant converter. The second terminal of the n-th voltage source $V_n$ is electrically connected to the second input of the n-th resonant converter.

Each switching circuit 830 has a first terminal and a second terminal. The first terminal of each switching circuit 830 is electrically connected to a connection node (A1, A2, ..., or An-1) of the second input of a corresponding resonant converter and the first input of its immediate next resonant converter, and the second terminal of each switching circuit 830 is electrically connected to a connection node (B1, B2, ..., Bn-1) of the second input of a corresponding voltage source and the first input of its immediate next voltage source. Each switching circuit 830 is configured to have an open state in which no electric current is allowed to pass through from one of the first and second terminals to the other of the first and second terminals, and a conductive state in which electric current is allowed to pass through from one of the first and second terminals to the other of the first and second terminals.

In operation, when an input voltage of the corresponding resonant converter or its immediate next resonant converter is in a desired range from a first predetermine value to a second predetermined value greater than the first predetermined value, the switching circuit operates in the open state, while when the input voltage of the corresponding resonant converter or its immediate next resonant converter is out of the desired range, the switching circuit operates in the conductive state so as to, through the corresponding voltage source or its immediate next voltage source, regulate the input voltage of the corresponding resonant converter or its immediate next resonant converter to the desired range. Each switching circuit 830 includes a switch, S1, S2, ..., or Sn-1, and a resistor, Z1, Z2, ..., or Zn-1, electrically connected to the switch. The switch can be any types of switches such as a bidirectional TVS, a varistor, a gas tube, a relay, one or more transistors, or a combination thereof.

Figure 9:
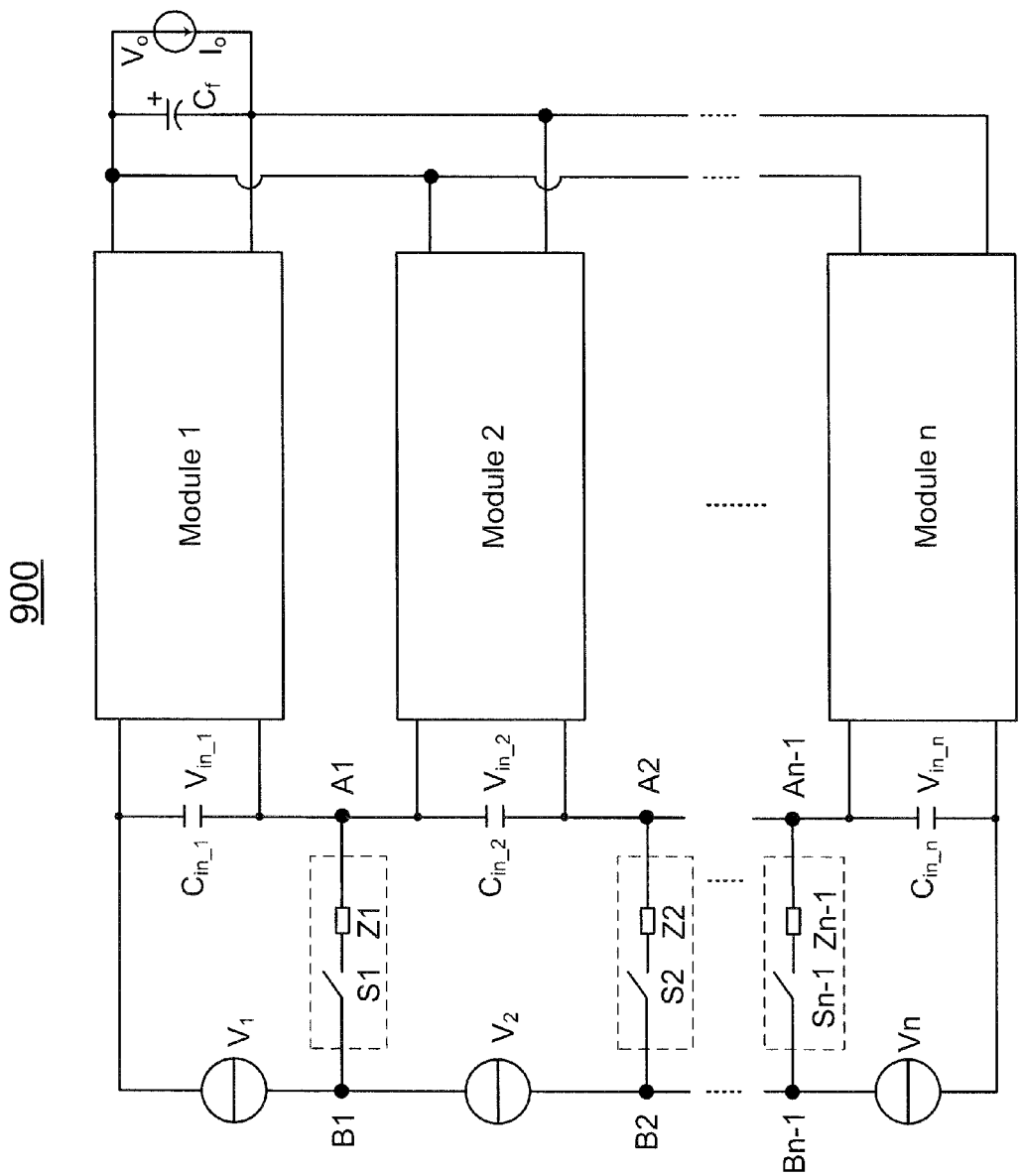
FIG. 9 shows a schematic diagram of a converter circuit according to another embodiment of the present invention.

FIG. 9 shows one embodiment of a converter circuit 900 according to the present invention. The converter circuit 900 is substantially the same as the converter circuit 800 shown in FIG. 8. But the converter circuit 900 includes n modules, instead of n resonant converters. Each module may include a resonant converter or other circuits. Similarly, the input voltage of each module can be regulated by a corresponding voltage source through a corresponding switching circuit.

Figure 10:
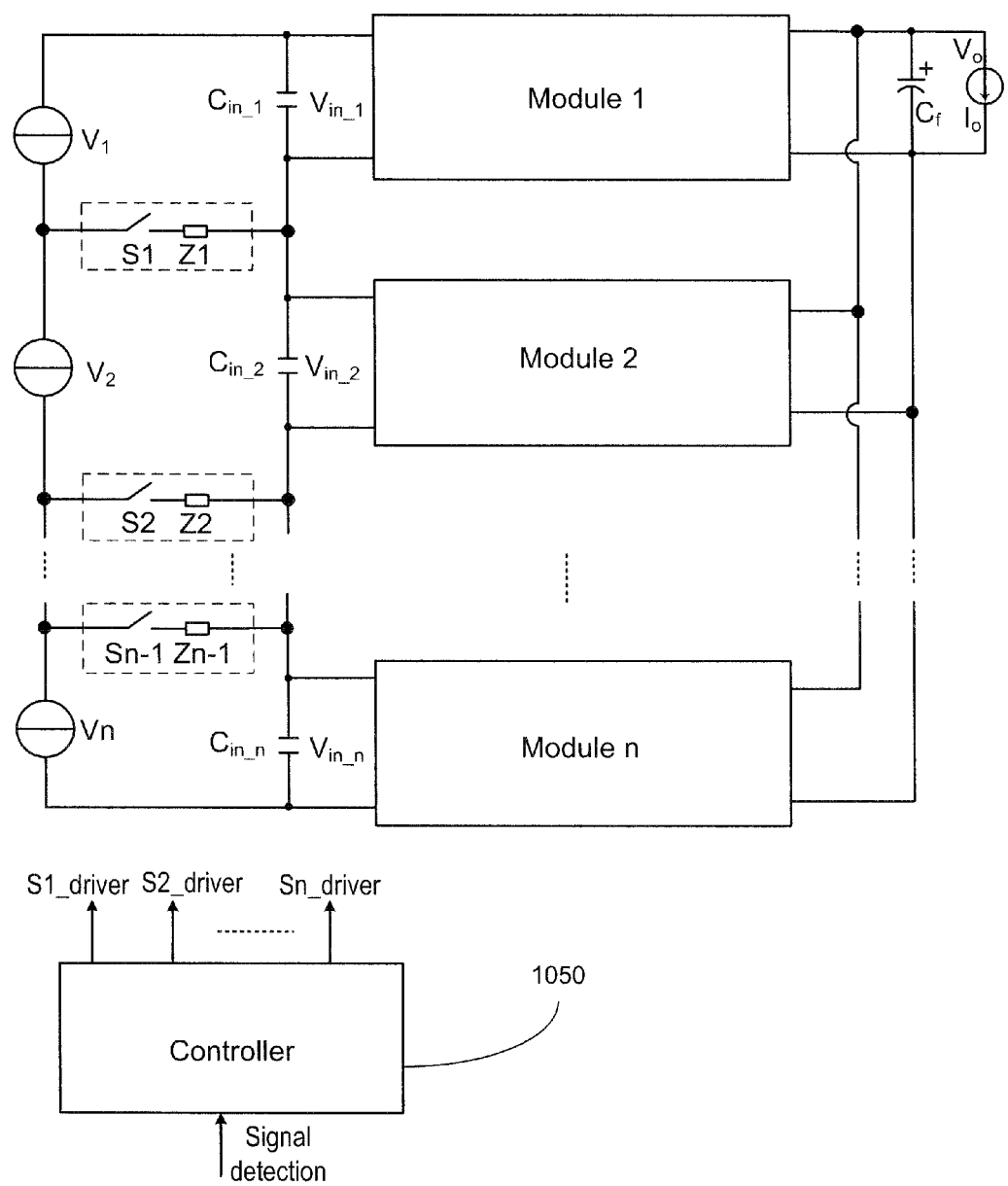
FIG. 10 shows a schematic diagram of a converter circuit according to yet another embodiment of the present invention.

As shown in FIG. 10, the converter circuit 1000 further includes a controller 1050 adapted for sensing the input voltage of each module for operating a corresponding switching circuit. For example, the controller 1050 may generate a plurality of switch driving signals, S1_driver, S2_driver, ..., Sn-1_driver, based on the detection of the input voltages of the n modules. Each of the switch driving signals, S1_drive, S2_driver, ..., Sn-1_driver is applied to the switch of a corresponding switching circuit to operate the switch to be in its open state or conductive state accordingly.

FIG. 11 lists several examples of the switch utilized in the present invention. Of examples, FIG. 11(A) is a bidirectional TVS. The TVS has a quite large resistance when it bears a voltage less than a rated voltage, which corresponds to its open state. When it bears a voltage larger than the rated voltage, the TVS has a voltage drop of an avalanche breakdown voltage, which corresponds to its conductive state. FIG. 11(B) is a varistor. The varistor has a quite large resistance when two terminals of which bear a voltage less than its rated value, which corresponds to its open state. And the varistor is turned on, has a rated voltage drop when the two terminals of which bear a voltage larger than its rated value, which corresponds to its conductive state. FIG. 11(C) is a gas tube. The gas tube is an open-circuit when two terminals of the gas tube bear a voltage less than a rated voltage value, which corresponds to its open state. And the gas tube is turned on as a short-circuit, has a voltage drop of substantially zero when the two terminals of the gas tube bear a voltage larger than the rated voltage value, which corresponds to its conductive state. FIG. 11(D) is two MOSFETs, and FIG. 11(E) is a series-connected full bridge MOSFET, where both are capable of operating at an open state or a conductive state based on an applied voltage thereto. It should be appreciated to those of skill in the art that other types of switches can also be employed to practice the present invention.

In one aspect, the present invention relates to a method for regulating input voltages of a converter circuit having a plurality of modules, each modules having a first input, a second input, a first output and a second output, where all the first inputs and the second inputs of the plurality of modules are electrically series-connected and all the first outputs and the second outputs of the plurality of modules are electrically parallel-connected.

The method in one embodiment includes the steps of providing a plurality of switching circuits, each switching circuit having a first terminal, a second terminal, an open state in which no electric current is allowed to pass through from one of the first and second terminals to the other of the first and second terminals, and a conductive state in which electric current is allowed to pass through from one of the first and second terminals to the other of the first and second terminals, where the first terminal of each switching circuit is electrically connected to a connection node of the second input of a corresponding module and the first input of its immediate next module; and operating each switching circuit in one of the open state and the conductive state in accordance with an input voltage of each module, such that when the input voltage of a module is in a desired range from a first predetermine value to a second predetermined value greater than the first predetermined value, a corresponding switching circuit operates in the open state, while when the input voltage of the module is out of the desired range, the corresponding switching circuit operates in the conductive state so as to regulate the input voltage of the module to the desired range.

The method may further include the step of sensing the input voltage of each module.

Additionally, the method may also have the step of providing a plurality of voltage sources, each voltage source having a first terminal and a second terminal, where the second terminal of any one but the last voltage source is electrically connected to the first terminal of its immediate next voltage source, the first terminal of the first voltage source is electrically connected to the first input of the first module, and the second terminal of the last voltage source is electrically connected to the second input of the last module, and the second terminal of each switching circuit is electrically connected to a connection node of the second input of a corresponding voltage source and the first input of its immediate next voltage source.

In sum, the present invention, among other things, recites a converter circuit that includes a plurality of modules having inputs electrically series-connected to each other and outputs electrically parallel-connected to each other and a plurality of switching circuits with each electrically connected to an input connection node of a corresponding module and its immediate next module, and configured such that when an input voltage of the corresponding module or its immediate next module is in a desired range from a first predetermine value to a second predetermined value greater then the first predetermined value, the switching circuit operates in an open state, while when the input voltage is out of the desired range, the switching circuit operates in a conductive state so as to regulate the input voltage of the corresponding module or its immediate next module in the desired range.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A converter circuit, comprising:
   (a) a plurality of modules, each modules having a first input, a second input, a first output and a second output, wherein the second input of any one but the last module is electrically connected to the first input of its immediate next module, and all the first outputs and the second outputs of the plurality of modules are electrically parallel-connected;
   (b) a plurality of voltage sources, each voltage source having a first terminal and a second terminal, wherein the second terminal of any one but the last voltage source is electrically connected to the first terminal of its immediate next voltage source, the first terminal of the first voltage source is electrically connected to the first input of the first module, and the second terminal of the last voltage source is electrically connected to the second input of the last module; and
   (c) a plurality of switching circuits, each switching circuit having a first terminal, a second terminal, an open state in which no electric current is allowed to pass through from one of the first and second terminals to the other of the first and second terminals, and a conductive state in which electric current is allowed to pass through from one of the first and second terminals to the other of the first and second terminals, wherein the first terminal of each switching circuit is electrically connected to a connection node of the second input of a corresponding module and the first input of its immediate next module, and the second terminal of each switching circuit is electrically connected to a connection node of the second input of a corresponding voltage source and the first input of its immediate next voltage source, such that when an input voltage of the corresponding module or its immediate next module is in a desired range from a first predetermine value to a second predetermined value greater than the first predetermined value, the switching circuit operates in the open state, and when the input voltage of the corresponding module or its immediate next module is out of the desired range, the switching circuit operates in the conductive state so as to, through the corresponding voltage source or its immediate next voltage source, regulate the input voltage of the corresponding module or its immediate next module to the desired range.

2. The converter circuit of claim 1, further comprising:
   (a) a plurality of input capacitors, each capacitor having a first terminal and a second terminal, wherein the first and second terminals of each capacitor are electrically connected to the first and second inputs of a corresponding module, respectively; and
   (b) an output capacitor having a first terminal and a second terminal electrically connected to the first output and the second output of each module, respectively.

3. converter circuit of claim 1, further comprising a controller adapted for sensing the input voltage of each module for operating a corresponding switching circuit.

4. The converter circuit of claim 1, wherein each switching circuit comprises a switch.

5. The converter circuit of claim 4, wherein each switching circuit further comprises a resistor electrically connected to the switch.

6. The converter circuit of claim 4, wherein the switch comprises a bidirectional transient voltage suppressor (TVS), a varistor, a gas tube, a relay, one or more transistors, or a combination thereof.

7. The converter circuit of claim 1, wherein each module comprises a resonant converter.

8. The converter circuit of claim 7, wherein the resonant converter comprises an LLC series resonant DC/DC converter or an LLC parallel resonant DC/DC converter.

9. The converter circuit of claim 8, wherein the plurality of modules operates at substantially the same frequency.

10. The converter circuit of claim 1, wherein each voltage source comprises a polarized capacitor.

11. The converter circuit of claim 10, further comprising a power factor correction (PFC) circuit electrically coupled between the plurality of voltage sources and an external power source.

12. The converter circuit of claim 11, further comprising an electromagnetic interference (EMI) filter electrically coupled between the PFC circuit and the external power source.

13. A converter circuit, comprising:
   (a) a plurality of modules, each modules having a first input, a second input, a first output and a second output, wherein the second input of any one but the last module is electrically connected to the first input of its immediate next module, and all the first outputs and the second outputs of the plurality of modules are electrically parallel-connected; and
   (b) a plurality of switching circuits, each switching circuit having a first terminal, a second terminal, an open state in which no electric current is allowed to pass through from one of the first and second terminals to the other of the first and second terminals, and a conductive state in which electric current is allowed to pass through from one of the first and second terminals to the other of the first and second terminals, wherein the first terminal of each switching circuit is electrically connected to a connection node of the second input of a corresponding module and the first input of its immediate next module, such that when an input voltage of the corresponding module or its immediate next module is in a desired range from a first predetermine value to a second predetermined value greater than the first predetermined value, the switching circuit operates in the open state, and when the input voltage of the corresponding module or its immediate next module is out of the desired range, the switching circuit operates in the conductive state so as to regulate the input voltage of the corresponding module or its immediate next module to the desired range.

14. The converter circuit of claim 13, further comprising a plurality of voltage sources, each voltage source having a first terminal and a second terminal, wherein the second terminal of any one but the last voltage source is electrically connected to the first terminal of its immediate next voltage source, the first terminal of the first voltage source is electrically connected to the first input of the first module, and the second terminal of the last voltage source is electrically connected to the second input of the last module, and wherein the second terminal of each switching circuit is electrically connected to a connection node of the second input of a corresponding voltage source and the first input of its immediate next voltage source.

15. The converter circuit of claim 13, further comprising a controller adapted for sensing the input voltage of each module for operating a corresponding switching circuit.

16. The converter circuit of claim 13, wherein each switching circuit comprises a switch.

17. The converter circuit of claim 13, wherein each switching circuit further comprises a resistor electrically connected to the switch.

18. The converter circuit of claim 16, wherein the switch comprises a bidirectional transient voltage suppressor (TVS), a varistor, a gas tube, a relay, one or more transistors, or a combination thereof.

19. The converter circuit of claim 13, wherein each module comprises a resonant converter.

20. The converter circuit of claim 19, wherein the resonant converter comprises an LLC series resonant DC/DC converter or an LLC parallel resonant DC/DC converter.

21. A method for regulating input voltages of a converter circuit having a plurality of modules, each modules having a first input, a second input, a first output and a second output, wherein all the first inputs and the second inputs of the plurality of modules are electrically series-connected and all the first outputs and the second outputs of the plurality of modules are electrically parallel-connected, the method comprising the steps of:

(a) providing a plurality of switching circuits, each switching circuit having a first terminal, a second terminal, an open state in which no electric current is allowed to pass through from one of the first and second terminals to the other of the first and second terminals, and a conductive state in which electric current is allowed to pass through from one of the first and second terminals to the other of the first and second terminals, wherein the first terminal of each switching circuit is electrically connected to a connection node of the second input of a corresponding module and the first input of its immediate next module; and (b) operating each switching circuit in one of the open state and the conductive state in accordance with an input voltage of each module, such that when the input voltage of a module is in a desired range from a first predetermine value to a second predetermined value greater than the first predetermined value, a corresponding switching circuit operates in the open state, and when the input voltage of the module is out of the desired range, the corresponding switching circuit operates in the conductive state so as to regulate the input voltage of the module to the desired range.

22. The method of claim 21, further comprising the step of sensing the input voltage of each module.

23. The method of claim 21, further comprising the step of providing a plurality of voltage sources, each voltage source having a first terminal and a second terminal, wherein the second terminal of any one but the last voltage source is electrically connected to the first terminal of its immediate next voltage source, the first terminal of the first voltage source is electrically connected to the first input of the first module, and the second terminal of the last voltage source is electrically connected to the second input of the last module, and wherein the second terminal of each switching circuit is electrically connected to a connection node of the second input of a corresponding voltage source and the first input of its immediate next voltage source.

24. The method of claim 21, wherein each module comprises a resonant converter.

25. The method of claim 24, wherein the resonant converter comprises an LLC series resonant DC/DC converter or an LLC parallel resonant DC/DC converter.

* * * * *